United States Patent [19]

Pekau

[11] 3,790,926
[45] Feb. 5, 1974

[54] METHOD FOR DETERMINING THE SPEED OF A VEHICLE
[75] Inventor: Dietlind Pekau, Krailling, Germany
[73] Assignee: Siemens Aktiengesellschaft, Berlin & Munich, Germany
[22] Filed: June 13, 1972
[21] Appl. No.: 262,341

[30] Foreign Application Priority Data
July 6, 1971 Germany.................. P 21 33 524.0

[52] U.S. Cl....................... 340/3 R, 340/5 H, 343/8
[51] Int. Cl............................................... G01s 9/66
[58] Field of Search..... 340/3 R, 3 D, 5 S; 343/8, 9, 343/100 CL

[56] References Cited
UNITED STATES PATENTS
3,066,279   11/1962   Marks................................. 340/3 R
3,631,384   12/1971   Smith, Jr............................. 340/5 H Primary Examiner—Richard A. Farley
Attorney, Agent, or Firm—Hill, Sherman, Meroni, Gross & Simpson

[57] ABSTRACT

A method of determining the speed of vehicle, particularly a ship by the transmission of coherent waves, with echo signals being received at a plurality of points along a receiving line extending parallel to the azimuth direction, with both phase and amplitude information of the received echo signals being recorded as a function of the receiving time, while applying a reference signal, thereby forming one-dimensional holograms, employing an impulse repetition having a time interval T between successive impulses such that the distance $d$, traveled by the vehicle within the time interval T is less than one-half of the overall distance between the first and last of said receiving points, (defining the length $L$ of the receiving line), i.e. $d<L/2$ in which a cross correlation function of the one-dimensional holograms of an impulse and the following impulse is formed, whereby the vehicle speed may be calculated from the positions of the correlation maximums.

17 Claims, 9 Drawing Figures

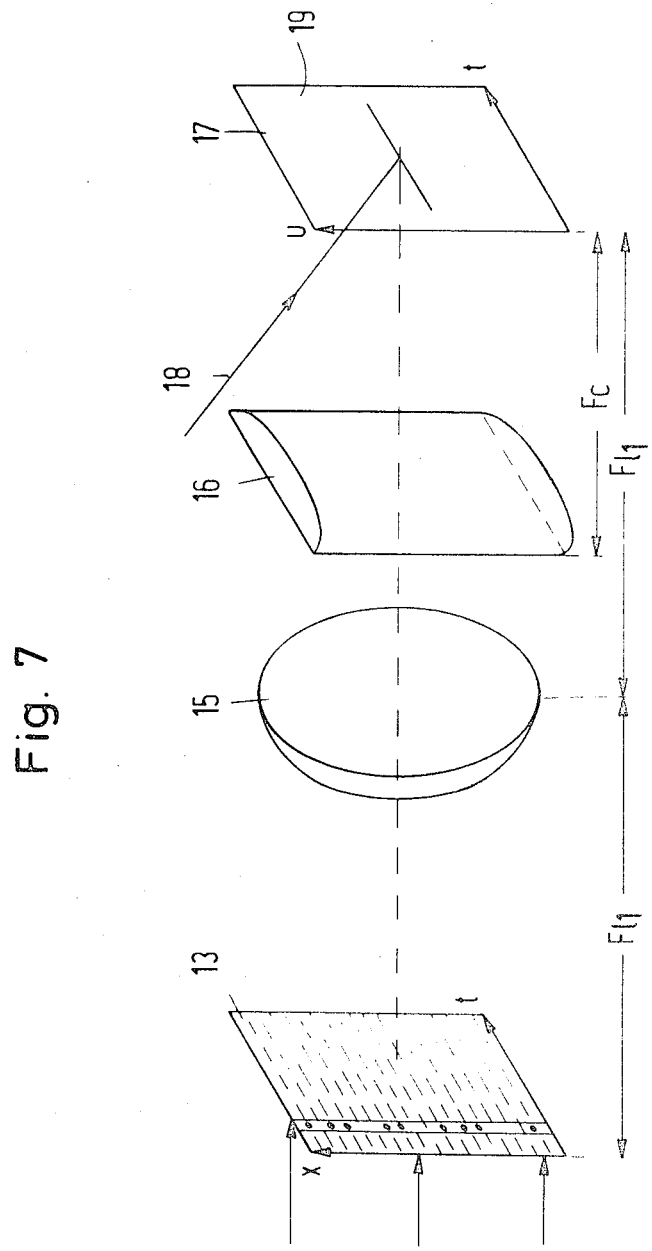

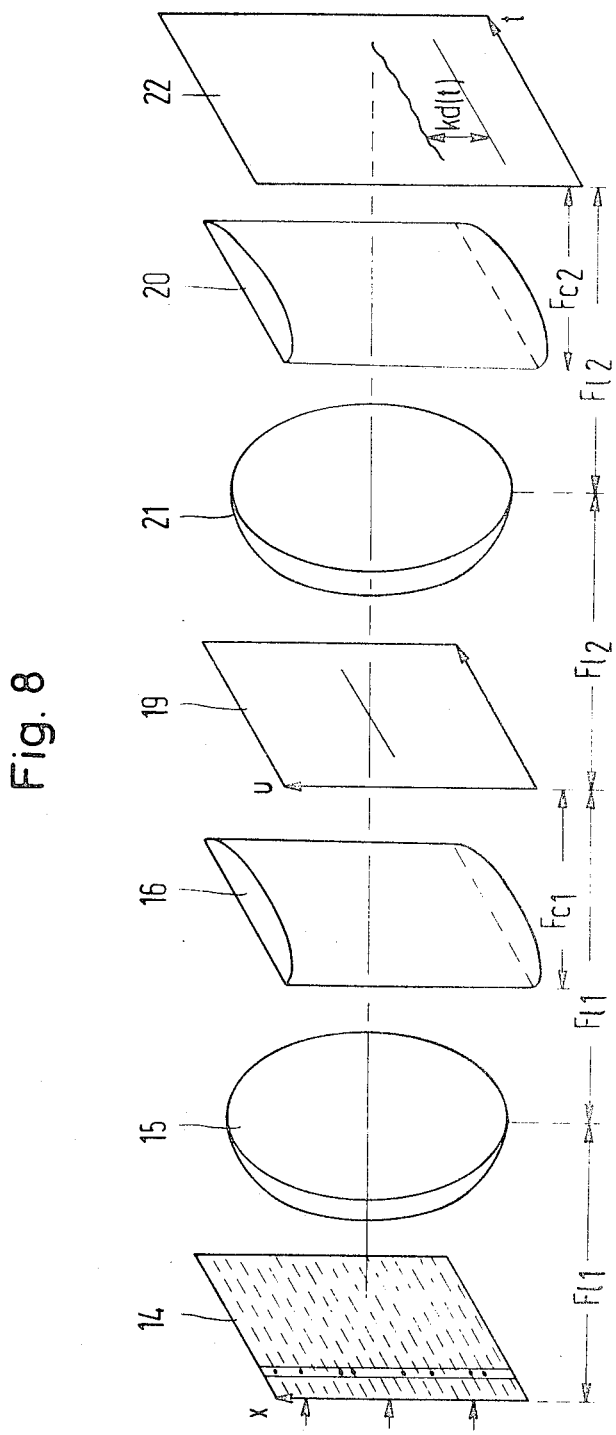

METHOD FOR DETERMINING THE SPEED OF A VEHICLE

BACKGROUND OF THE INVENTION

The invention is directed to a method for determining the speed of a vehicle, particularly a ship, utilizing a plurality of receivers arranged in a line extending parallel to the azimuth direction and adapted to receive echo signals produced by the transmission of coherent waves, whereby both the phase information and the amplitude information of the echo signals received by the respective receivers may be recorded as a function of the receiving time and with a cooperable reference signal to form one-dimensional holograms.

By the utilization of side-looking sonar techniques highly resolved images can be obtained by the use of ultrasonic waves. In the practice thereof a succession of ultrasonic impulses, hereinafter designated as sonar impulses, is transmitted by a ship with the echos of the targets being received by a plurality of receivers such as transducers, arranged in a line which extends parallel to the direction of the ship movement. Following superimposition of a reference signal coherent to the transmitted waves, the signals are recorded in such a way that the reception time is plotted in one coordinate direction while the object coordinate is maintained parallel to the direction of ship movement, to produce one-dimensional sub-holograms which are in correct phase alignment. However, this result is possible only when the change of the receiving position relative to the initial transmission of the last impulse is known with an exactness on the order of the acoustic wavelength.

The present invention therefore is directed to the problem of providing a method which will enable the measurement of changes in the position of a vehicle, such as a ship, and thus the speed thereof between two points, with an exactness on the order of the acoustic wavelengths involved (several centimeters).

BRIEF SUMMARY OF THE INVENTION

The problem is solved in the present invention by the employment of a method, of the type initially mentioned, in which the pulse succession frequency of the transmitted impulses is so selected that the distance $d$ traversed by the vehicle in the time interval $T$ between two successive impulses is smaller than half the length of the sound transducers, i.e. $L/2$, and the cross correlation function of the one-dimensional holograms of an impulse and those of the following impulse is formed with the vehicle speed thus being determined from the position of the correlation maximums.

The references signal preferably is supplied for the echo signal of each transducer in a form coherent with the transmitted waves, and combined therewith in a mixing stage, before or after the scanning process.

The cross correlation function may be derived by optical methods, in which case, the output signal of each transducer, together with a superimposed reference signal, may be supplied to suitable means such as a controllable light source, for example, a light bulb or liminescent diode, the output from which may be reproduced on a light sensitive material, moved along a line of such light sources at a constant speed during the reception of the echos of an impulse, in the direction at right angles to the azimuth direction. A photochromic material or a photographic material can be utilized for the recordation.

The cross correlation of the holograms preferably can be effected by the employment of coherent-optical, one-dimensional, adapted filtering, parallel to the azimuth direction.

In accordance with a preferred example of the invention, the one-dimensional holograms of an impulse are recorded on a film, utilizing an electro-optical converter which will then depict the amplitude transmission $s_1(x,t)$, to produce a one-dimensional adapter filter, by means of which the series of sub-holograms $s_2(x,t)$ of the next impulse can be filtered.

In order to avoid operational delays resulting from film exposure and development processing, in a particular advantageous embodiment of the invention the recordation of the one dimensional holograms of an impulse may be effected by the use of an electro-optical converter employing a laser beam, which can be directly modulated, either by amplitude or phase in correspondence to the electrical signals. Advantageously, a liquid crystal picture screen, a thermoplastic picture screen, or a so-called "Titus tube" can be utilized as such an electro-optical converter. In order to record the adapter filter, a reversible photochromic or thermoplastic material advantageously may be employed.

The desired results may be achieved in particularly rapid manner by conducting the output signals of the transducer to a suitable calculating device, for example an electronic computer, for deriving the cross correlation function of the one-dimensional holograms of an impulse and those of the following pulses. In this connection, so-called anolog computers are particularly suitable.

The method of the invention is particularly applicable in connection with a so-called side-looking sonar method in which the transmitted waves are ultrasonic waves and the transducers are in the form of ultrasonic converters. However, it is also possible to utilize the invention in connection with other waves, for example high frequency electromagnetic waves, such as utilized in radar techniques.

BRIEF DESCRIPTION OF THE DRAWINGS

In the drawing wherein like characters indicate like or corresponding parts;

FIG. 7 illustrates an arrangement for effecting a recordation utilizing an adapter filter, from which the changes in ship position may be determined;

FIG. 8 illustrates a first arrangement for recording the cross correlation, utilizing an adapter filter.

DETAILED DESCRIPTION OF PREFERRED EMBODIMENTS OF THE INVENTION

Figure 1:
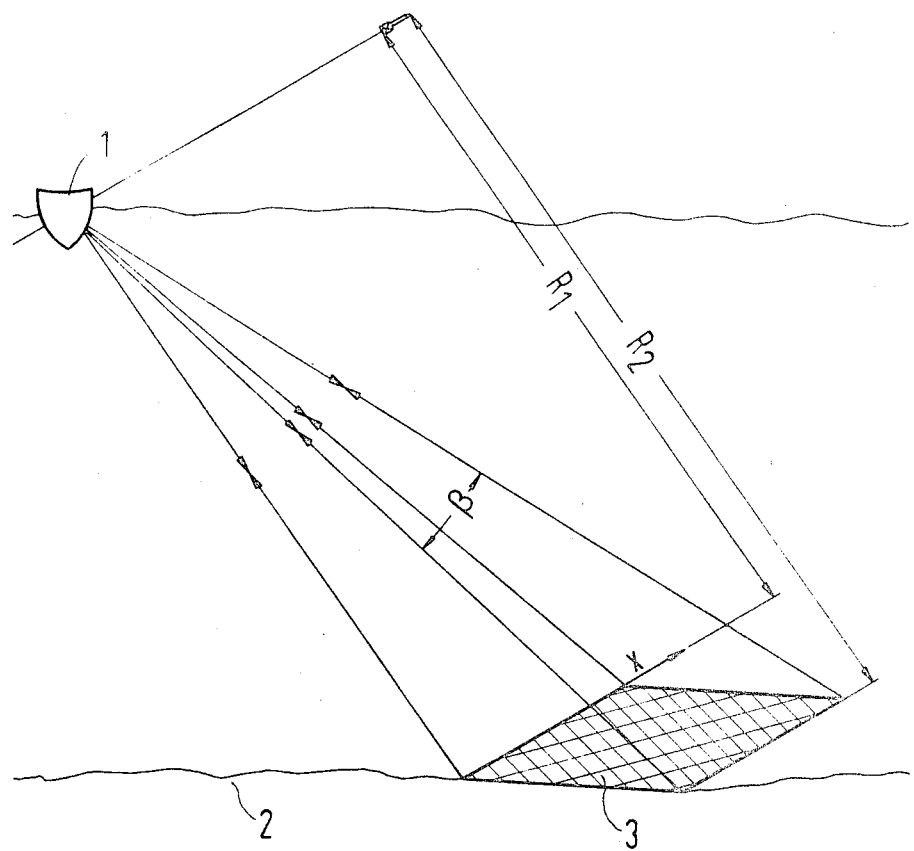
FIG. 1 is a sketch illustrating a ship and sea bottom for explanation of the present sonar system.

Referring to FIG. 1, the reference numeral 1 designates a ship upon the surface of a body of water extending above a sea bottom 2 in which the ship carries an ultrasonic transmitter for the transmission of ultrasonic waves over an effective aperture angle of $\beta$, which transmitted waves are reflected by the sea bottom 2 in the range of the target surface 3 being radiated at distances $R_1$ through $R_2$ from the ship 1.

Figure 2:
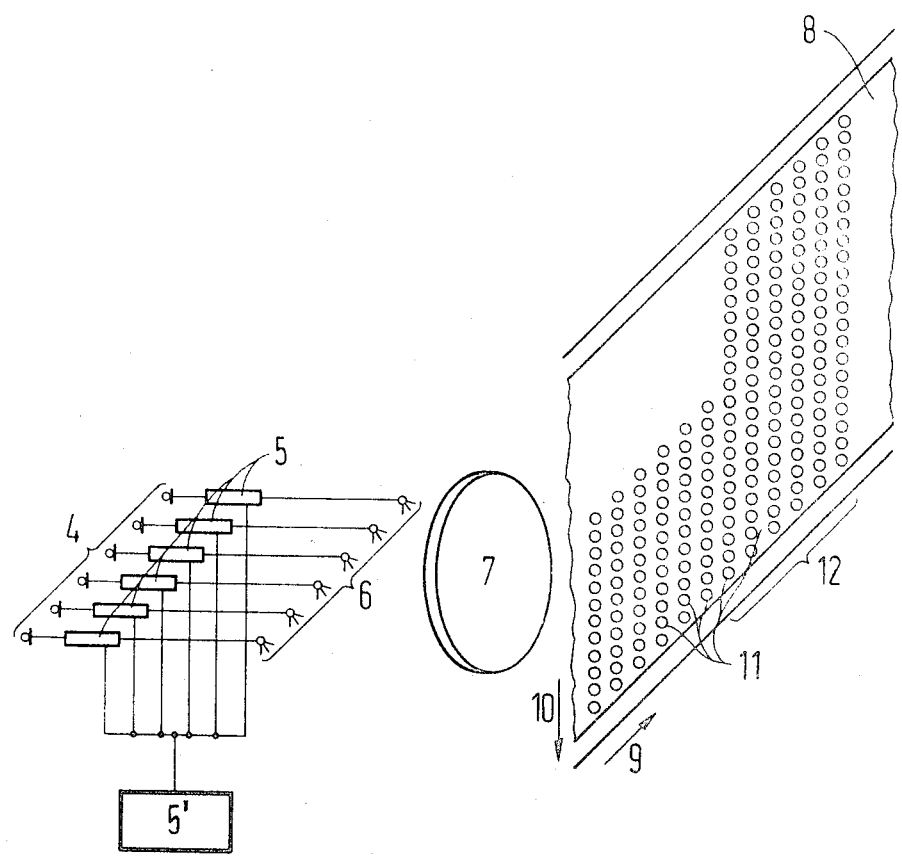
FIG. 2 schematically illustrates an arrangement for effecting the recording of sonar echos.

FIG. 2 illustrates a line of converters, i.e. sound transducers 4, the output signals from which are adapted to control respective light sources 6 over corresponding mixing stages 5, each of which is provided with a coherent reference signal from the reference signal generator 5'. The sources 6 are imaged on a photographic film 8, passing through a lens 7 interposed therebetween, with the photographic film being moved in the direction of the arrow 9, corresponding to the azimuth direction, i.e. the direction of movement of the ship, at a speed proportional to the speed of the ship. The film is simultaneously moved at a constant speed, in the direction of the arrow 10, during transmission of an ultrasonic impulse and is then returned to its original position. As a result, there is produced on the film 8 the recordation of the light sources 6 in the form of picture tracks 11. The group of picture tracks embraced by the bracket 12 represents signals of the preceding ultrasonic impulse.

The sonar map thus is constructed from the one-dimensional holograms recorded in this manner.

Figure 3:
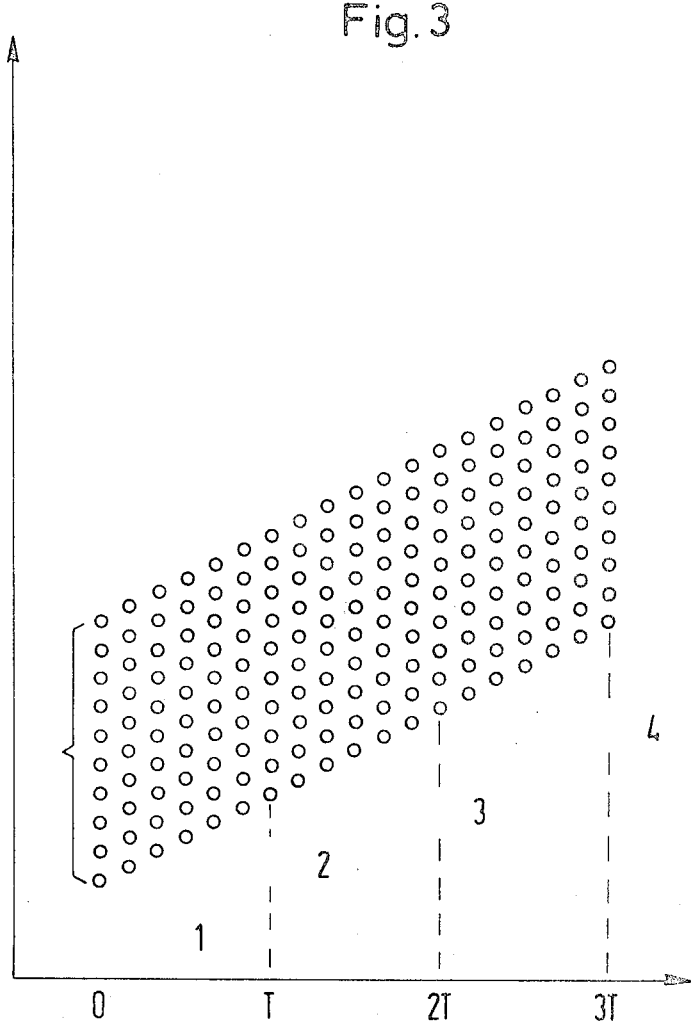
FIG. 3 illustrates the position of a sound transducer line as a function of time.
Figure 4:
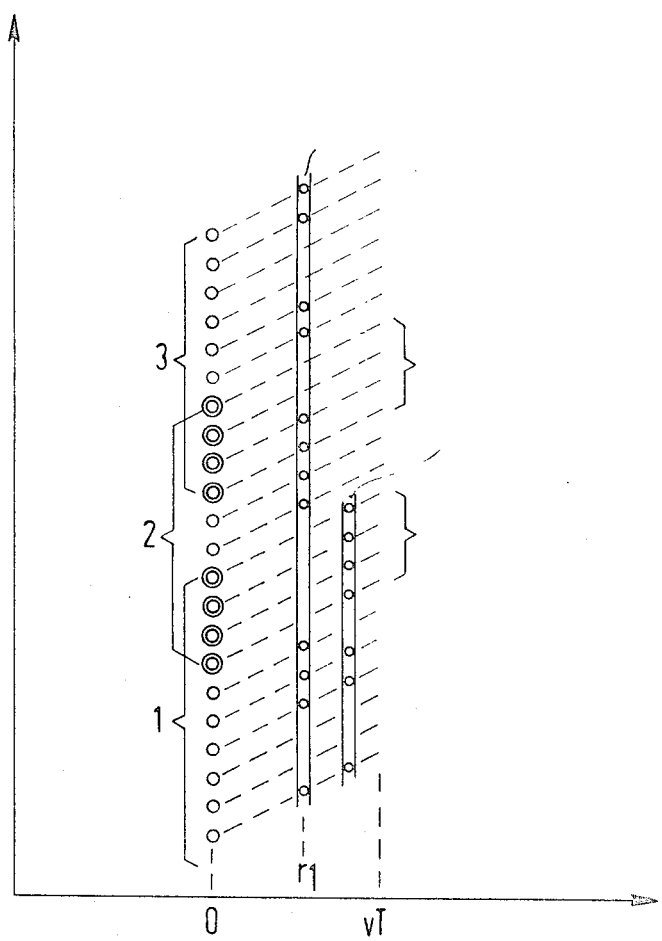
FIG. 4 schematically illustrates the recordation of signals received by the sound transducer line, as a function of azimuth and distance.

FIGS. 3 and 4 schematically illustrate the recordation of echo signals in which FIG. 3 illustrates the position of the sound transducer line as a function of time. However, for the recordation of the one dimensional holograms, by means such as illustrated in FIG. 2, the effective transducer position must be recorded for each target distance, as illustrated in FIG. 4, whereby the effective transducer position is selected to be equal to the initial position during the reception of the preceding impulse, plus twice the distance covered by the ship since the reception of such echo impulse, for all impulses with the exception of the first. Twice the distance covered by the ship must be added to the initial position of the transducer as both the sound transmitter and sound receiver, i.e. converter are moved and both movements are equivalent during the hologram recordation.

In order to effect a simplification, the assumption has been made, with respect to the illustrations of FIGS. 3 and 4, that a constant ship movement is involved, so that the effective transducer positions form a straight line as a function of time. It is here assumed that the pulse frequency of the transmitted ultrasonic impulse is such that the distance traversed by the ship within the time T is less than one-half the length of the transducer line, i.e. the distance from the first to the last transducer in the line. Consequently, a repetition of signals will then be produced substantially as illustrated in FIG. 4. The signals which are received by the sound transducers along a length $L - 2d(t)$ at the beginning of the transducer line, thus are identical with the signals which are received after the transmission of the preceding impulse by the transducers in a length $L - 2d(t)$ at the end of the transducer line, in which L is the length of the transducer line and $d(t)$ is the distance which is covered by the ship within the time T.

By effecting a comparison of the subholograms of two successive impulses, the change in the ship position $d(t)$ since the reception of the preceding subholograms of equal distance can be determined at each instant, and thus the speed $[d(t)]/T$ of the ship can be determined.

The subholograms can also be compared by a cross correlation. Thus, if the signals of two successive impulses at a time $t$ after the transmission of the respective impulse are given by $f_1(x,t)$ and $f_2(x,t)$, the case the cross correlation function of the associated subholograms of equal reception time t is represented by the following equation:

$$C(u, t) = \int_{-\infty}^{+\infty} f_1^*(x - u, t) f_2(x, t) dx$$

in which case the $x$ coordinate represents the position of the receiver on the transducer line. The maximum of this function is at $u = -2d$, since $f_1(x + 2d, t) = f_2(x, t)$ for $x < L - 2d$. Thus, by determining the coordinates $u$ of these maximums, the change of the ship position can be determined as a function of time $d(t)$, whereby the ship's speed is thus determined.

The cross correlation function and its maximum can be determined by either means of an electronic computer or by coherent-optical filtering.

Figure 6:
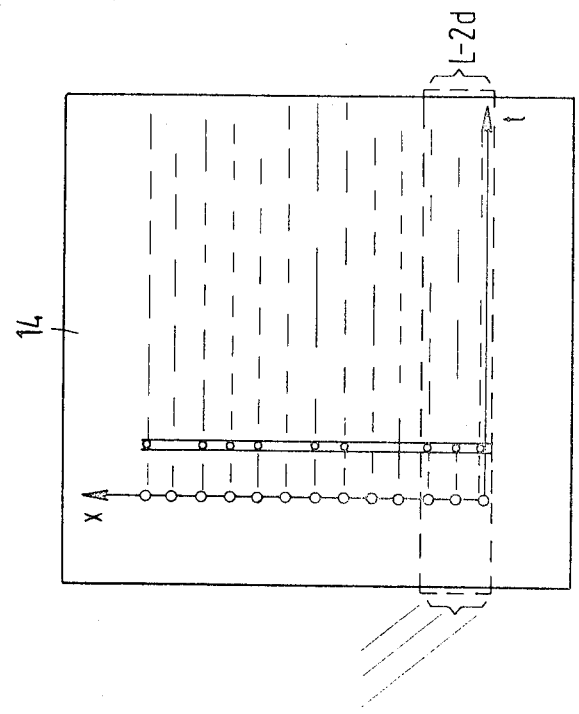
FIG. 6 illustrates the sub-holograms of a second sonar impulse, similarly recorded.
Figure 5:
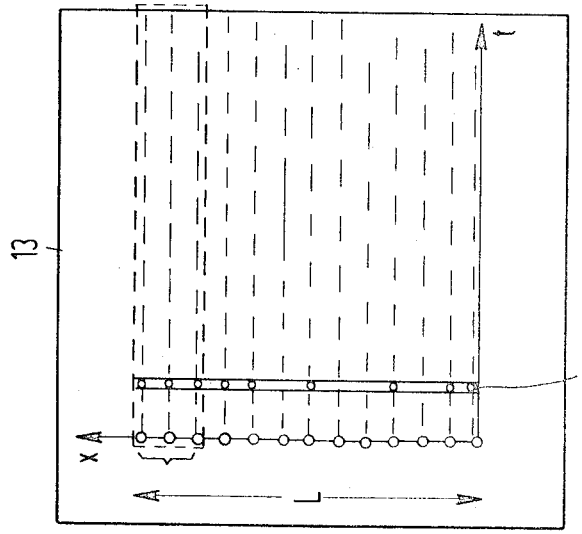
FIG. 5 illustrates a sub-hologram of a first sonar impulse, for example as recorded on a film.

In the employment of coherent-optical filtering, the one dimensional holograms of an ultrasonic impulse are initially recorded on a film by means of a suitable electronic-optical converter (for example by series of light sources such as luminescent diodes, or an oscillographic picture screen) and the film is moved along the line of light sources at a constant speed during reception of the echo of an ultrasonic impulse, in the direction vertical to the azimuth direction, as illustrated in FIG. 2. In this case, the amplitude transmission for the function $f_1(x, t)$ will be as illustrated in FIG. 5 while the amplitude transmission $f_2(x,t)$, for the following ultrasonic impulse will be as illustrated in FIG. 6. Consequently, a one-dimensional adapted filter may be produced on the film for the amplitude transmission $f_1(x,t)$ according to FIG. 5, which may then be employed for filtering the series of subholograms $f_2(x,t)$ of the following impulse.

FIG. 7 schematically illustrates an arrangement for the production of the adapted filter. In this case the film 13 with the amplitude transmission $f_1(x,t)$ is traversed by a laser beam so that with the utilization of a spherical lens 15 and a cylindrical lens 16, the one-dimensional Fourier transform $F_1(u,t)$ will be produced. In this case, the $t$ coordinate is recorded in the focal plane $(u,t)$ 17 of the spherical lens, utilizing the cylindrical lens 15.

In such focal plane 17, the adapted filter is recorded on a photo plate 19, following the addition of a reference laser beam 18. After development of the photo plate 19, its transmission may be represented by the following equation:

$T = F_1(u, t)^2 + R_{ref}^2 + F_1^*(u, t) R_{ref} + F_1(u, t) R^*_{ref}$

If the adapted filter with the Fourier transform $F_2(u,t)$ of the one-dimensional holograms of the next sonar impulse is traversed, a field distribution $F_1^*(u,t) F_2(u,t) R_{ref}$ will be produced from the second term of the above equation, which expands in another direction, as compared with the other three terms, due to the presence of the factor $R_{ref}$. The cross correlation given by the first equation can be obtained by means of a further Fourier transform since the Fourier-transform of the product of two functions is equal to the cross correlation of the Fourier transform of this function.

The recordation of the cross correlation, utilizing an adapted filter is schematically illustrated in FIG. 8, in which the adapted filter 19, after development is reset into its original position occupied during exposure, and after development the film 13 is replaced by the film 14 with the one dimensional hologram $f_2(x,t)$, so that the Fourier transform $F_2(u,t)$ traverses the corresponding filter. By means of a further one-dimensional Fourier transform utilizing a cylindrical lens 20 which records the t coordinate of the filter plane in the focal plane of the spherical lens 21, the one-dimensional cross correlation of the holograms $f_1(x,t)$ and $f_2(x,t)$ will be produced in the correlation plane 22. The change of the ship position $d(t)$ between the reception of two successive holograms of equal distance can be directly read and evaluated from the position of the maximums of the correlation, as a function of time. It will be appreciated that other read methods may be utilized, for example one in which the correlation plane 22 is scanned, by a television camera.

Figure 9:
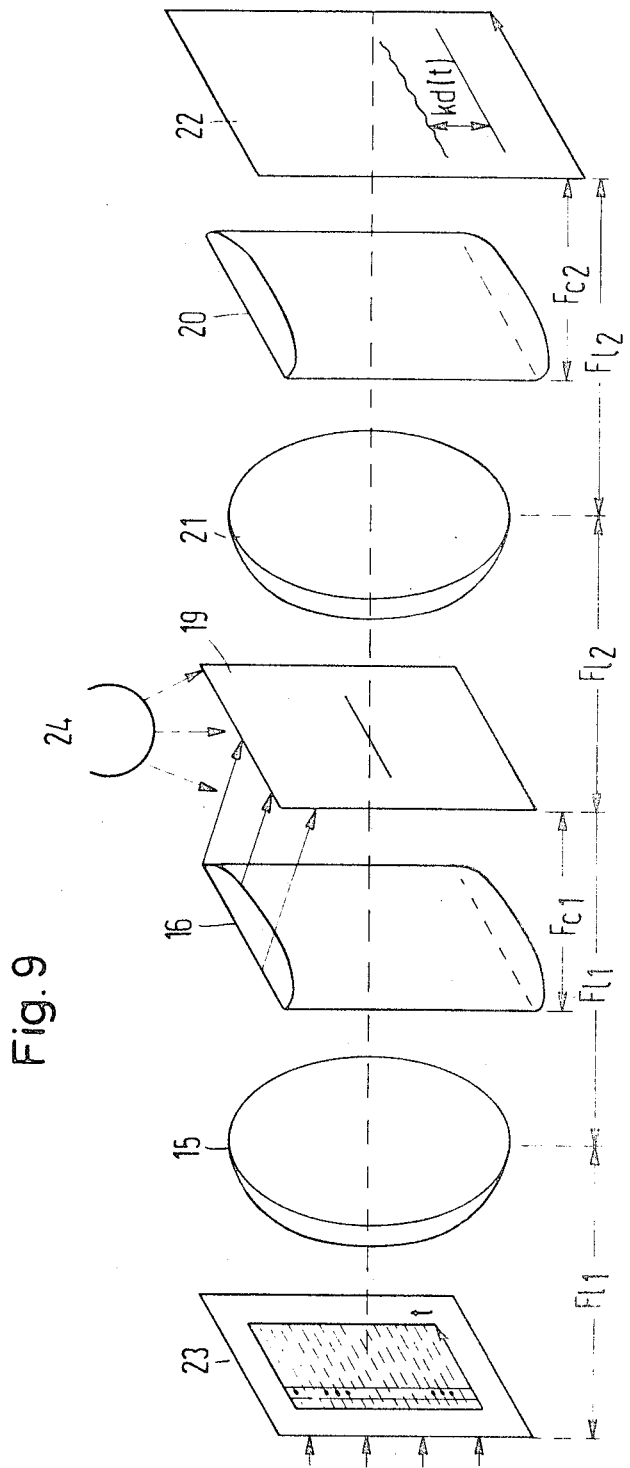
FIG. 9 illustrates a second arrangement for effecting recordation of the cross correlation employing filtering.

In many instances it is desirable that the change in the ship position be determined without the delays occasioned by the development processing of the photo plate, and the arrangement illustrated in FIG. 9 eliminates such delay. In this arrangement, the one-dimensional hologram of the ultrasonic impulses are recorded with the utilization of an electro-optical converter 23 which enables a direct amplitude or phase modulation of the laser beam corresponding to the signals $f(x,t)$. For example, such a converter may include a crystal picture screen, a thermoplastic picture screen, or a so-called "Titus tube." In this arrangement the adapted filter 19 may be a reversible photochromic or thermoplastic material. Thus, following the recording of an adapted filter of the one-dimensional holograms of an ultrasonic impulse, the signals $f_2(x,t)$ of the next ultrasonic impulse may be recorded on the electro-optical converter 23 whereby the cross correlation $f_1(x,t) * f_2(x,t)$ will appear in the focal plane of the lens 21. Thereafter, the corresponding filter 19 may be suitably erased by means of exposing the photochromic or thermoplastic material to infra-red radiation 24, so that the next adapted filter of the function $f_2(x,t)$ can be recorded.

In order to improve the signal-noise ratio it is possible to limit the signals to those of a few transducers at the end of the transducer line, for the production of the adapted filters, as only these signals are repetitious. If the method is to be utilized only in the determination of the ship position, and not for the illustration of objects below the water, with the use of synthetic side-looking sonar, the arrangement can be additionally simplified. In this case it is not necessary to receive the echos of the targets subjected to the acoustic radiation, with an entire line of transducers, since merely a few transducers at the beginning and at the end of a straight line are sufficient for a cross correlation. Furthermore, it is not required for navigational purposes to determine the cross correlation for each receiving time but only for an individual subhologram as it is usually sufficient merely to determine the change of the ship's position once within the time interval T, rather than continuously.

In each case the individual transducers should not be rotated during the recordation of the echos of two impulses and therefore preferably should be mounted in a rotation-stable fixed sound transparent housing.

Having thus described my invention, it will be obvious from the above description that various immaterial modifications may be made in the same without departing from the spirit and scope of the invention.

I claim as my invention:

1. A method of determining the speed of a vehicle, particularly a ship, by the transmission of coherent waves, with echo signals thereof being received at a plurality of points along a receiving line extending parallel to the azimuth direction, with both phase and amplitude information of the received echo signals being recorded as a function of the receiving time, while applying a reference signal, thereby forming one dimensional holograms, comprising the steps of effecting transmission of said coherent waves as a plurality of sequential impulses having a time interval T between successive impulses, employing an impulse repetition frequency such that the distance $d$, traveled by the vehicle within the time interval T is less than one-half of the overall distance between the first and last of said receiving points (defining the length $L$ of the receiving line), i.e. $d<L/2$, and forming a cross correlation function of the one-dimensional holograms of an impulse and the following impulse, whereby the positions of the correlation maximums are representative of the vehicle speed.

2. A method according to claim 1, comprising supplying the reference signal, in the form of a signal coherent with the transmitted waves, to each received echo signal.

3. A method according to claim 1, comprising the steps of superimposing the respective received echo signals and such reference signal, applying the superimposed signal to a line of controllable light sources for energizing the light sources, recording the energized states of the light sources on a light-sensitive material, moving the light-sensitive material along first and second coordinates at a speed in the first, azimuth direction proportional to the speed of the vehicle, and at a speed in the second direction which is constant during echo reception.

4. A method according to claim 3, comprising the step of returning the light-sensitive material to its original position with respect to movement in the second direction before reception of the first echo of the next impulse.

5. A method according to claim 3, wherein the step of recording comprises recording on photochromic material.

6. A method according to claim 3, wherein the step of recording comprises recording on photographic material.

7. A method according to claim 1, wherein the cross correlation of the holograms is effected by coherent optical one-dimensional adapted filtering, parallel to the azimuth direction.

8. A method according to claim 7, comprising the steps of converting the echo signals of an impulse to optical signals, said recording step comprising recording on a recording medium, such optical signals, with such signals comprising the amplitude transmission $f_1(x, t)$, to produce a one-dimensional adapted filter, and filtering therewith the series of subholograms $f_2(x, t)$ of the next impulse.

9. A method according to claim 8 comprising the step of impacting said filter, depicting the amplitude transmission $f_1(x, t)$, with a laser beam, passing the filtered beam through spherical and cylindrical lenses to produce a one-dimensional Fourier transform $F_1(u, t)$, recording such transform on a photomedium, developing the photomedium, returning the same to its original position, substituting for the filter depicting the amplitude transmission $f_1(x, t)$, a filter depicting the amplitude transmission $f_2(x, t)$ of the next impulse, impacting said last-mentioned filter with such laser beam to produce a one-dimensional Fourier transform $F_2(u, t)$ which traverses said photomedium and thereafter passing the traversing beam through a cylindrical lens, and a spherical lens to record the t coordinate of the filter plane in the focal plane of the spherical lens and produce the one-dimensional cross correlation of the holograms $f_1(x, t)$ and $f_2(x, t)$.

10. A method according to claim 7, comprising the steps of effecting an electro-optical conversion in the formation of the one-dimensional holograms of an impulse, and effecting a direct amplitude or phase modulation of a laser beam in correspondence to the electrical signals.

11. A method according to claim 10, comprising effecting the electro-optical conversion with a liquid crystal picture screen.

12. A method according to claim 10, comprising effecting the electro-optical conversion with a thermoplastic picture screen.

13. A method according to claim 10, comprising effecting the electro-optical conversion with a "Titus tube."

14. A method according to claim 7, wherein a reversible photochromic or thermo-plastic material is utilized in the electro-optical conversion as an adapted filter.

15. A method according to claim 1, wherein only the echo signals of the first and last receiving points of the line are utilized in the forming of the cross-correlation function.

16. A method according to claim 1, wherein the output signal at the respective receiving points are supplied to an electronic computer for deriving the cross correlation function of the one-dimensional holograms of an impulse and those of the following impulse.

17. A method according to claim 1, wherein the transmitted and received waves comprise ultrasonic waves.

* * * * *